United States Patent
Rusanovskyy et al.

(10) Patent No.: US 12,301,856 B2
(45) Date of Patent: May 13, 2025

(54) HISTORY-BASED ADAPTIVE INTERPRETATION OF CONTEXT CODED SYNTAX ELEMENTS FOR HIGH BIT-DEPTH VIDEO CODING

(71) Applicant: QUALCOMM Incorporated, San Diego, CA (US)

(72) Inventors: Dmytro Rusanovskyy, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/934,318

(22) Filed: Sep. 22, 2022

(65) Prior Publication Data

US 2023/0107599 A1    Apr. 6, 2023

Related U.S. Application Data

(60) Provisional application No. 63/250,876, filed on Sep. 30, 2021.

(51) Int. Cl.
*H04N 19/176*    (2014.01)
*H04N 19/18*     (2014.01)
*H04N 19/46*     (2014.01)

(52) U.S. Cl.
CPC .......... *H04N 19/46* (2014.11); *H04N 19/176* (2014.11); *H04N 19/18* (2014.11)

(58) Field of Classification Search
CPC ....... H04N 19/46; H04N 19/176; H04N 19/18
See application file for complete search history.

(56) References Cited

U.S. PATENT DOCUMENTS

| | | | |
|---|---|---|---|
| 6,678,423 B1 | 1/2004 | Trenary et al. | |
| 2008/0189589 A1 | 8/2008 | Park et al. | |
| 2014/0307800 A1* | 10/2014 | Sole Rojals | H04N 19/176 |
| | | | 375/240.18 |
| 2022/0337811 A1* | 10/2022 | Choi | H04N 19/176 |

FOREIGN PATENT DOCUMENTS

| | | |
|---|---|---|
| WO | 2021040492 A1 | 3/2021 |
| WO | 2022217272 A1 | 10/2022 |

OTHER PUBLICATIONS

Bross B., et al., "Versatile Video Coding (Draft 10)," 131, MPEG Meeting, Jun. 22, 2020-Jul. 1, 2020, Online, (Motion Picture Expert Group or ISO/IEC JTC1/SC29/WG11), No. m54716, JVET-S2001, Jul. 1, 2020, XP030289305, JVET-S2001-V9, 545 Pages, section 9.3.3 Binarization process with subsections, pp. 414-424.

(Continued)

*Primary Examiner* — Dave Czekaj
*Assistant Examiner* — Berteau Joisil
(74) *Attorney, Agent, or Firm* — Shumaker & Sieffert, P. A.

(57) ABSTRACT

A device for decoding video data can determine transform coefficients for a first block of a slice; derive a shift parameter for a second block of the slice based on the transform coefficients for the first block; receive one or more flags; determine a transform coefficient for the second block based on the one or more flags and based on the shift parameter; and output a decoded version of the second block based on the determined transform coefficient.

22 Claims, 9 Drawing Sheets

(56) References Cited

OTHER PUBLICATIONS

Browne A., et al., "AHG8: On Significance, GT1, and GT2 Flag Coding for High Bit Depths," JVET-W0093-v2, Joint Video Experts Team (JVET) of ITU-T SG 16 WP 3 and ISO/IEC JTC 1/SC 29, 23rd Meeting, by teleconference, Jul. 7-16, 2021, pp. 1-24.
International Search Report and Written Opinion—PCT/US2022/076909—ISA/EPO—Dec. 22, 2022 16 Pages.
ITU-T H.265: "Series H: Audiovisual and Multimedia Systems Infrastructure of Audiovisual Services—Coding of Moving Video," High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video," Versatile Video Coding, The International Telecommunication Union, Aug. 2020, 516 pages.
Rusanovskyy D., et al., "CE-1.1, CE-1.2 and CE-1.4: On the Rice Parameter Derivation for High Bit-Depth Coding," JVET-V0052, Joint Video Experts Team (JVET) of ITU-T SG 16 WP 3 and ISO/IEC JTC 1/SC 29, 22nd Meeting, by Teleconference, m56433, Apr. 20-28, 2021, pp. 1-21, XP030294053, The whole document.

* cited by examiner

HISTORY-BASED ADAPTIVE INTERPRETATION OF CONTEXT CODED SYNTAX ELEMENTS FOR HIGH BIT-DEPTH VIDEO CODING

This application claims the benefit of U.S. Provisional Patent Application No. 63/250,876, filed 30 Sep. 2021, the entire contents of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure described techniques related to the signaling of residual data and, more specifically, to the signaling of transform coefficients. As will be described in more detail below, by deriving a shift parameter for a block of transform coefficients, as opposed to explicitly signaling such a shift parameter, the techniques of this disclosure may reduce the signaling overhead associated with signaling transform coefficients. Moreover, by deriving a shift parameter for a block of transform coefficients, as opposed to explicitly signaling such a shift parameter, the techniques of this disclosure may enable the shift parameter to change on a per-block basis, as opposed to, for example, on a per-slice basis without incurring significant signaling overhead. The techniques of this disclosure may be particularly beneficial for coding high-bit depth video data, such a video that is 10-bits or higher, which tends to result in larger residual values, and hence larger values for transform coefficients.

According to one example, a method of decoding video data includes determining transform coefficients for a first block of a slice; deriving a shift parameter for a second block of the slice based on values of the transform coefficients for the first block; receiving one or more flags; determining a transform coefficient for the second block based on the one or more flags and based on the shift parameter; and outputting a decoded version of the second block based on the determined transform coefficient.

According to another example, a device for decoding video data includes a memory configured to store video data and one or more processors implemented in circuitry and configured to determine transform coefficients for a first block of a slice; derive a shift parameter for a second block of the slice based on values of the transform coefficients for the first block; receive one or more flags; determine a transform coefficient for the second block based on the one or more flags and based on the shift parameter; and output a decoded version of the second block based on the determined transform coefficient.

According to another example, a computer-readable storage medium stores instructions that when executed by one or more processors cause the one or more processors to determine transform coefficients for a first block of a slice; derive a shift parameter for a second block of the slice based on values of the transform coefficients for the first block; receive one or more flags; determine a transform coefficient for the second block based on the one or more flags and based on the shift parameter; and output a decoded version of the second block based on the determined transform coefficient.

According to another example, an apparatus for decoding video data includes means for determining transform coefficients for a first block of a slice; means for deriving a shift parameter for a second block of the slice based on values of the transform coefficients for the first block; means for receiving one or more flags; means for determining a transform coefficient for the second block based on the one or more flags and based on the shift parameter; and means for outputting a decoded version of the second block based on the determined transform coefficient.

The details of one or more examples are set forth in the accompanying drawings and the description below. Other features, objects, and advantages will be apparent from the description, drawings, and claims.

DETAILED DESCRIPTION

Figure 1:
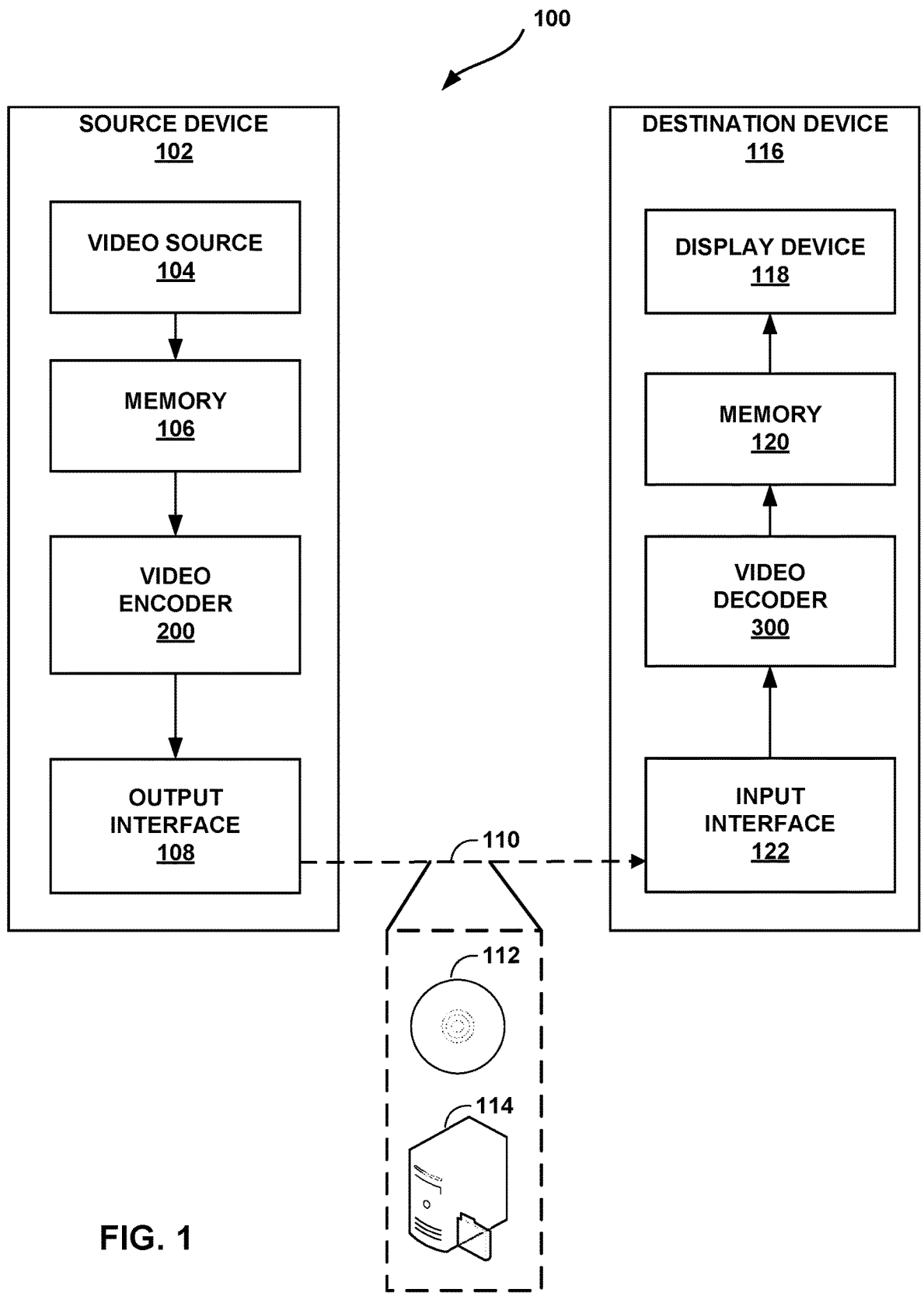
FIG. 1 is a block diagram illustrating an example video encoding and decoding system that may perform the techniques of this disclosure.

This disclosure describes techniques to improve entropy coding processes in high bit-depth coding, including the coding of transform coefficients as well the corresponding signaling of overhead information. The proposed techniques may, for example, be used in conjunction with an extension of the Versatile Video Coding (VVC) standard, a successor standard to VVC, or other such video coding standards or codecs.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes techniques related to the signaling of residual data and, more specifically, to the signaling of transform coefficients. Existing techniques utilize context coded flags for signaling values of a transform coefficients, but the shift parameter for interpreting these flags is only updated once per slice. As will be described in more detail below, by deriving a shift parameter for a block of transform coefficients, as opposed to explicitly signaling such a shift parameter, the techniques of this disclosure may reduce the signaling overhead associated with signaling transform coefficients. Moreover, by deriving a shift parameter for a block of transform coefficients, as opposed to explicitly signaling such a shift parameter, the techniques of this disclosure may enable the shift parameter to change on a per-block basis, as opposed to, for example, on a per-slice basis without incurring significant signaling overhead. The techniques of this disclosure may be particularly beneficial for coding high-bit depth video data, such a video that is 10-bits or higher, which tends to result in larger residual values, and hence larger values for transform coefficients.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. As will be explained in more detail below, this disclosure generally describes techniques for deriving a shift parameter, and the same deriviation process may be performed at both a video encoder and a video decoder. Also, a video encoder typically performs video decoding (also called reconstruction) as part of the processes of determining how to encode video data. For example, a video encoder may perform deblocking filtering on decoded video blocks in order to determine whether a certain encoding scheme produces a desirable rate-distortion tradeoff and also so that the video encoder can perform motion estimation using the same blocks available to a video decoder when the video decoder performs motion compensation.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may include any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for determining contexts for coding transform coefficient data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for determining contexts for coding transform coefficient data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may be or include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of VVC is described in Benjamin Bross, Jianle Chen, Shan Liu and Ye-Kui Wang, "Versatile Video Coding (Draft 10)" Joint Video Experts Team (JVET) of ITU-T SG 16 WP 3 and ISO/IEC JTC 1/SC 29/WG 11, Doc. JVET-S2001, 19th Meeting: Teleconference, 22 Jun.-1 Jul. 2020.

In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use context coding for transform coefficient data.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video encoder (such as video encoder 200) partitions a coding tree unit (CTU) into CUs according to a quadtree structure. That is, the video encoder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video encoder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, video encoder 200 partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than rn. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. In contrast, "deriving" generally refers to a determination that is made without explicit, or direct, signaling. As noted above, source device 102 may transport the bitstream to destination device 116 substantially in real time, or not in real time, such as might occur when storing syntax elements to storage device 112 for later retrieval by destination device 116.

Video encoder 200 and video decoder 300 may be configured to perform Rice parameter derivation for regular residual coding (RRC). Various techniques will be described with respect to video decoder 300, but it should be understood that unless indicated to the contrary, such techniques may also be performed by video encoder 200. In VVC, a Rice parameter for RRC may be derived using a look-up table based on coefficient values of the neighboring transform coefficients in a template.

Figure 2:
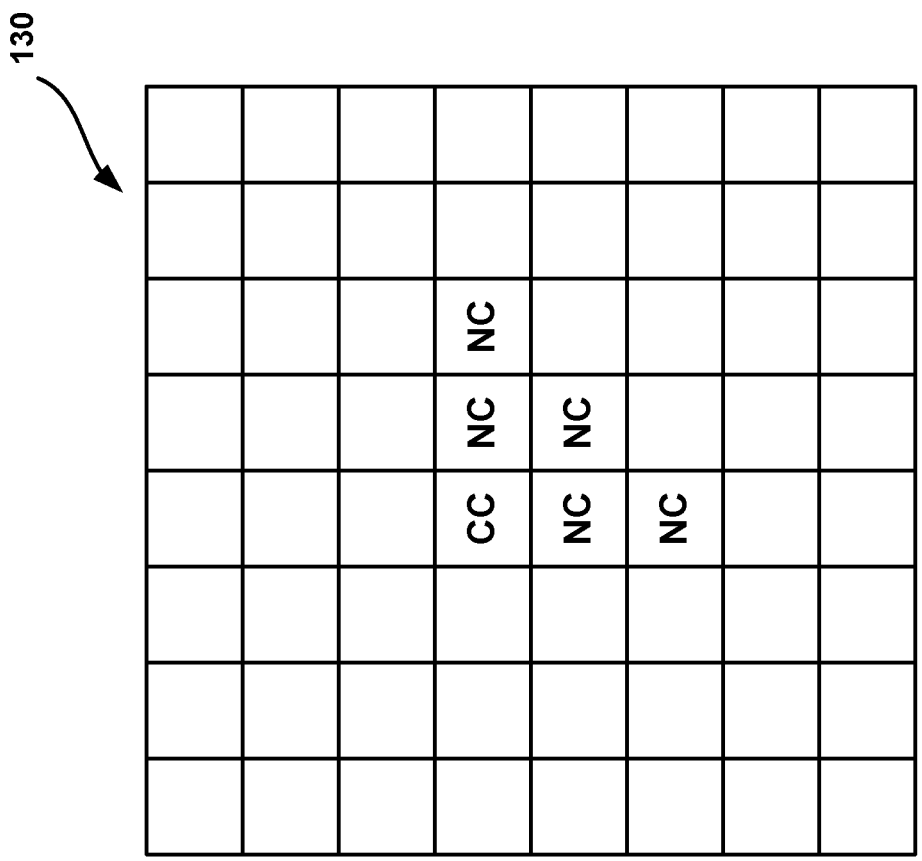
FIGS. 2 and 3 show example so neighboring coefficients relative to a current coefficient.

FIG. 2 shows an example of a template for the neighboring coefficients. In the example of FIG. 2, CC represents a current coefficient of block 130 that is currently being decoded. NC represents a portion of already-decoded coefficients of block 130 that form the template for the current coefficient CC.

Video decoder 300 may first calculate a value for locSumAbs, which is the sum of the absolute values of five available neighboring coefficients in the template. FIG. 2 shows an example of neighboring coefficients which are used in calculation of the locSumAbs of the current coefficient. Video decoder 300 may then normalize (subtraction and clip) the value for locSumAbs as follows:

locSumAbs=Clip3(0,31,locSumAbs−baseLevel*5)

Video decoder 300 may then derive the Rice parameter using locSumAbs with a look-up table (Table 1). With existing designs, the Rice parameter range is constrained from 0 to 3.

Video encoder 200 and video decoder 300 may also be configured to perform modified Rice parameter derivation as proposed for the High Bit Depth extension of VVC.

Techniques to solve the limitation of VVC's Rice parameter derivation in various input bit-depths of video, and thus improve compression efficiency of the coding design, have been proposed.

In one example, video decoder 300 may scale, or normalize, the value of localSumbAbs to handle bitdepth increases or dynamical range of transform coefficients before being used to derive Rice parameter, such as in Eq. 1517 of the VVC specification, reproduced below. The amount of scaling factor may depend on the input bitdepth, predefined operational bit depth (e.g. 10), a local acitivity of transform coefficients, block size, or syntax ellements signalled in the bitstream. Then, video decoder 300 may clip locSumAbs to a certain range, for example, using the clipping of locSumAbs in VVC. Then, video decoder 300 may use the normalized and clipped value of locSumAbs to derive the Rice parameter using a predefined lookup table, such as the look up table in VVC (Table 128). With localSumbAbs being normalized in the first step of the proposed design, the Rice parameter may be derived from a predefined Table (e.g. Table 128 of VVC), and finally modified by adding an offset to extend the dynamical range of the Rice parameter range.

9.3.3.2 Rice Parameter Derivation Process for abs_remainder[ ] and dec_abs_level[ ]

Inputs to this process are the base level baseLevel, the colour component index cIdx, the luma location (x0, y0) specifying the top-left sample of the current transform block relative to the top-left sample of the current picture, the current coefficient scan location (xC, yC), the binary logarithm of the transform block width log 2TbWidth, and the binary logarithm of the transform block height log 2TbHeight.

Output of this process is the Rice parameter cRiceParam.

Given the array AbsLevel[x][y] for the transform block with component index cIdx and the top-left luma location (x0, y0), the variable locSumAbs is derived as specified by the following pseudo-code process:

```
locSumAbs = 0
if( xC < ( 1 << log2TbWidth ) − 1 ) {
locSumAbs += AbsLevel[ xC + 1 ][ yC ]
if( xC < ( 1 << log2TbWidth ) − 2 )
locSumAbs += AbsLevel[ xC + 2 ][ yC ]
if( yC < ( 1 << log2TbHeight ) − 1 )
locSumAbs += AbsLevel[ xC + 1 ][ yC + 1 ](1517)
}
if( yC < ( 1 << log2TbHeight ) − 1 ) {
locSumAbs += AbsLevel[ xC ][ yC + 1 ]
if( yC < ( 1 << log2TbHeight ) − 2 )
```

TABLE 1

Look-up table for Rice Parameter based on locSumAbs

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

-continued

```
locSumAbs += AbsLevel[ xC ][ yC + 2 ]
}
shift = (Bitdepth – b) > 0 ? Floor(Log2(a*(Bitdepth – b))) : 0
locSumAbs = (shift == 0) ? locSumAbs: (locSumAbs + (1 << (shift –1)
)) >> shift
locSumAbs = Clip3( 0, 31, locSumAbs – baseLevel * 5 )
```

Given the variable locSumAbs, the Rice parameter cRiceParam is derived as specified in Table 128.

cRiceParam is then is refined as:

cRiceParam=cRiceParam+c

In some examples, variables a, b, and c can be defined as follows. In one example, the value "b" may specify operation bitdepth and be set equal to 10. The value of "a" may be set equal to an integer value (e.g. 4) or other value of power of 2, and the value of "c" may be set equal to the computed shift value, or derived from the shift value.

In another example, video decoder 300 may scale and/or normalize locSumAbs when larger than or equal to a threshold. In this case, the related Rice parameter derivation described in VVC Draft 10 may be changed as follows:
9.3.3.2 Rice Parameter Derivation Process for abs_remainder[ ] and dec_abs_level[ ]

Inputs to this process are the base level baseLevel, the colour component index cIdx, the luma location (x0, y0) specifying the top-left sample of the current transform block relative to the top-left sample of the current picture, the current coefficient scan location (xC, yC), the binary logarithm of the transform block width log 2TbWidth, and the binary logarithm of the transform block height log 2TbHeight.

Output of this process is the Rice parameter cRiceParam.

Given the array AbsLevel[x][y] for the transform block with component index cIdx and the top-left luma location (x0, y0), the variable locSumAbs is derived as specified by the following pseudo-code process:

```
locSumAbs = 0
if( xC < ( 1 << log2TbWidth ) – 1 ) {
locSumAbs += AbsLevel[ xC + 1 ][ yC ]
if( xC < ( 1 << log2TbWidth ) – 2 )
locSumAbs += AbsLevel[ xC + 2 ][ yC ]
if( yC < ( 1 << log2TbHeight ) – 1 )
locSumAbs += AbsLevel[ xC + 1 ][ yC + 1 ](1517)
}
if( yC < ( 1 << log2TbHeight ) – 1 ) {
locSumAbs += AbsLevel[ xC ][ yC + 1 ]
if( yC < ( 1 << log2TbHeight) – 2 )
locSumAbs += AbsLevel[ xC ][ yC + 2 ]
}
shift = (Bitdepth – b) > 0) && (locSumAbs – baseLevel * 5) >= T ?
Floor(Log2(a*(Bitdepth – b))) : 0
locSumAbs = (shift == 0) ? locSumAbs: (locSumAbs + (1 << (shift –1)
)) >> shift
locSumAbs = Clip3( 0, 31, locSumAbs – baseLevel * 5 )
```

Given the variable locSumAbs, the Rice parameter cRiceParam is derived as specified in Table 128.

cRiceParam is then is refined as:

cRiceParam=cRiceParam+c

In the above example, T is a predefined threshold. In one example, T may be set equal to 32.

In some examples, the values of variables a, b, and c can be signalled in the bitstream or set dependent on, or derived from, the bitdepth, local statistics (e.g. min/max or mean of the transform coefficients values within current block), decoded transform or block size, or one or more syntax ellements signalled in the bitstream.

An overview of the history of the concept for Rice parameter derivation for regular residual coding will now be provided.

Figure 3:
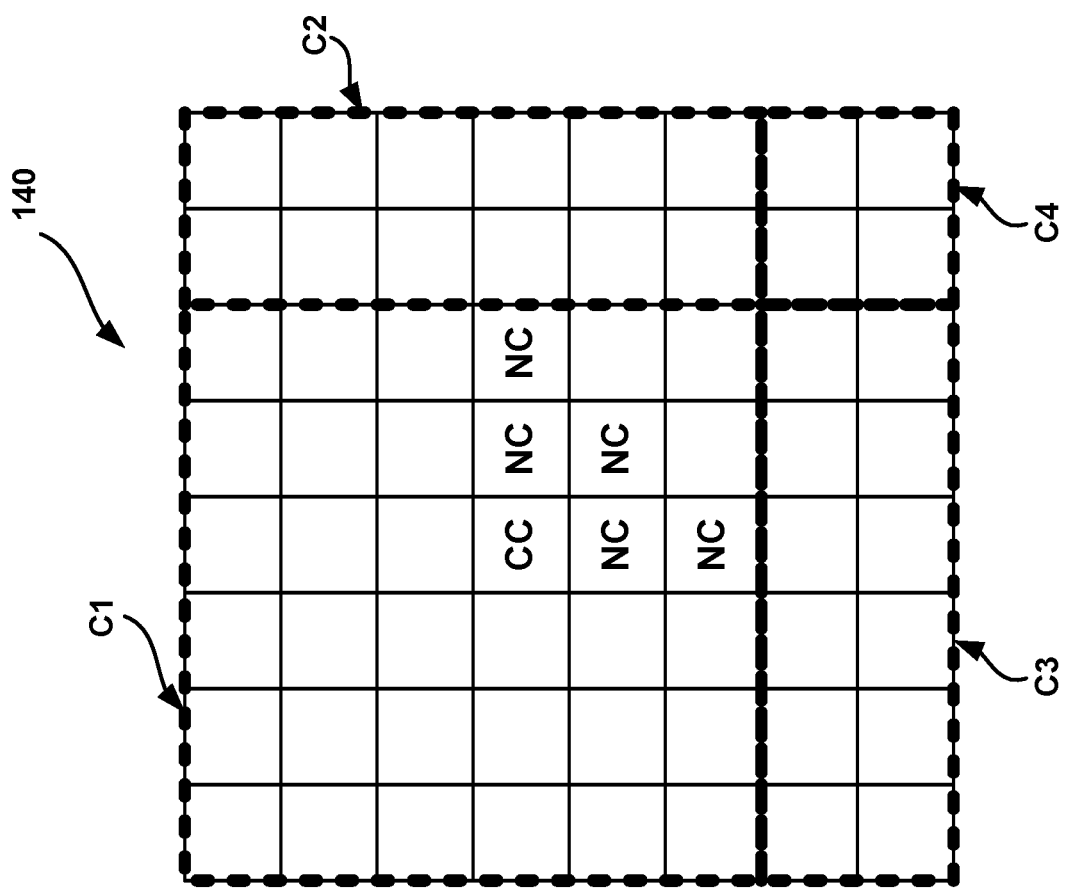

Video encoder 200 and video decoder 300 may perform various techniques to classify spatial positions of decoded coefficients within a TU per an anticipated accuracy of template-based derivation processes. An example of this classification is shown in FIG. 3 for TU 140. In such an example, coeffients with spatial positions outlined by box C1 are expected to have accurate Rice derivation from the template-based process, for example as defined in VVC Draft 10 clause 9.3.3.2, and based on a possible modification provided below.

riceParam=template_based_method( )

Coeffients with spatial positions outlined by box C4 are expected to not have accurate Rice derivation from the template-based process, and thus a history-based derivation process may be used instead.

riceParam=history_based_method( )

The coeffients with spatial positions outlined by box C2 and box C3 are expected to have reduced accuracy Rice derivation from the template-based process, but the accuracy can be improved by taking into consideration Rice estimates that are derived from history of the decoded coefficients.

riceParam=function(template_based_method( ),history_based_method( )).

In some examples, the classification can be based on the run of the scan order in inverse direction, e.g. assigning the N first decoded coefficients to C4 and classifying the rest of coefficients as C1.

In some examples, a sub-set of the defined classes, such as only C4 class decoded coefficients, use Rice information from the history, and support of the C1 class can be extended to incorporate the area of C2/C3 (or the entire TU). Thus, no history information is used for Rice derivation.

According to a first technique for aggregating local and historic derivations, video decoder 300 may be configured to aggregate Rice information from a template-based process and a history-based process, which can be implemented by a weighted average, as shown by the example below:

ricePar=(w2*riceParTemplate+w1*riceParHistory)/(w1+w2)

In some examples, the weights of the weighted average may be dependendent on a spatial location of a coefficient within a TU.

According to a second technique for aggregating local and historic derivations, video decoder 300 may integrate local estimates and historic information into the template-based derivation, such that Rice parameters derived from history can be taken into consideration during the template-based Rice derivation if local information is not available. An example is shown below with proposed changes to the existing template-based method. Term histCoef defines an estimated historic transform coefficient, e.g. accumulated in past, or expressed to historic Rice parameter, e.g. histCoef=1<<histRiceParam. The terms M and N are estimated weight values, e.g. integer values that may be equal to 2 and 3 for N and M respectively.

```
unsigned templateAbsSum( int scanPos, const TCoeff* coeff, int
baseLevel )
{
   const uint32_t posY = m_scan[scanPos].y;
   const uint32_t posX = m_scan[scanPos].x;
   const TCoeff* pData = coeff + posX + posY * m_width;
   TCoeff sum = 0;
   if (posX < m_width - 1)
   {
      sum += abs(pData[1]);
      if (posX < m_width - 2)
      {
         sum += abs(pData[2]);
      }
      else sum += histCoef;
      if (posY < m_height - 1)
      {
         sum += abs(pData[m_width + 1]);
      } else sum += histCoef;
      else sum += histCoef;
   }
   else sum += N * histCoef;
   if (posY < m_height - 1)
   {
      sum += abs(pData[m_width]);
      if (posY < m_height - 2)
      {
         sum += abs(pData[m_width << 1]);
      }
      else sum += histCoef;
   }
   else sum += M * histCoef;
   return unsigned(std::max<TCoeff>(std::min<TCoeff>(sum - 5 *
baseLevel, 31), 0));
}
```

According to a technique for history updating, video decoder 300 may implement a history for Rice derivation as a counter, or moving average value storage for decoded transform coefficient or Rice parameter or length of binary codeword required to express decoded transform coefficient.

For each class identified by index riceClass, video decoder 300 may calculate and store a separate history for coutner StatCoeff[riceClass]. During TU decoding, each decoded transform coefficient defined for history update (e.g. number of such coefficients NUM_HISTORY_UP-DATE) can be expressed through a binary codelength estimate, which may be indicative of an optimal Rice parameter.

codeLength=floorLog2((uint32_t)decodedCoef);

Video decoder 300 may use the number of decoded transform coefficient (e.g. equal to NUM_HISTORY_UP-DATE) to update the historic observation, with the sum of the codelength and number of coefficients used in update being stored.

collectStatCoeff[riceClass]+=codeLength.

counterCollectStatCoeff[riceClass]++

After all samples defined for history update of current class are parsed, a global history counter StatCoeff can be updated, as shown below, through a liner model, such as a weighted moving average:

*int* numCollected=NUM_HISTORY_UPDATE-
    g_counterCollectStatCoeff[*i*];

*int* averageRiceInTU=(*int*)(g_tempStatCoeff[*i*]+
    (numCollected>>1))/numCollected);

StatCoeff[*i*][compID]=(*w*3*StatCoeff[*i*][compID]+
    *w*4*averageRiceInTU)/(*w*3+*w*4)

In the example above, compID represents an identification of a color component, such as Y, Cb, or Cr. The terms w3 and w4, like w1 and w2 above, are parameters for controlling the speed of the history adaptation through weighted average of new information with current state of the counter StatCoeff. Different classes of StatCoeff may have different parameters of history updated, e.g., w1,w2/w3, w4.

In some examples, parameters of the linear model can be selected as derivatives of power of 2, to enable a low complexity multiplication or division operations.

In some examples, video decoder 300 may be configured to maintain a history counter through a certain region of the decoded picture, such as a full picture, slice, tile, group of CTUs, or a single CTU with normative reset at the start of the group of CTUs.

In some examples, video decoder 300 may initialize a history counter with a default value. A default value can be tabulated and provided to video decoder 300 as side information, signalled through a coded bitstream (e.g. at the slice level or through a special update signaling mechanism), or derived at the decoder side from bitdepth, quantization parameters, or other syntax ellements.

In some examples, a history updating process, e.g. speed of update or parameters of moving averagem, can be made dependent on the block size, ratio of block dimensions, coding modes, such as intra/inter, or slice type or signalled syntax ellements.

Techniques for history value application will now be described. In some examples, with history being stored as Rice parameter derivatives, video decoder 300 may be configured to derive a history value histCoef as follows:

historyRiceValue=StatCoeff[*i*][compID];

histCoef=1<<historyRiceValue;

In some examples, with history being stored as transform coefficient derivative, video decoder 300 may be configured to derive a history value histCoef as follows:

historyValue=StatCoeff[*i*][compID];

histCoef=historyValue;

In some examples, a histCoef derivation process can be altered as a function of the spatial location of the coefficient within a TU, for example as a function of a sub-group id to which the coefficient belongs. Examples of altering can include offset to the histRice value, or offset or scaler to the histCoef value.

In some examples, histCoef value can be be made dependent on the type of coefficient being encoded or decoded. For example, if part of the coefficient was coded with context coding, then only a remaining part is coded with a Rice method.

Techniques for a history reset will now be described. In some examples, video decoder 300 may be configured to maintain a history counter through a certain region of the decoded picture, such as a full picture, slice, tile, group of CTUs, or a single CTU with normative reset at the start of the said partitioning.

StatCoeff[*i*][compID]=DefaultHistoryValue

In some examples, with history being stored as Rice parameter derivatives, a default values for the history reset can be expressed as function of bitdepth of the coded data, or internal bitdepth. Non limiting example of such dependency may be expressed as follows:

DefaultHistoryValue=(bitDepth-10)>0?floorLog2(4*
    (bitDepth-10)):0;

StatCoeff[*i*][compID]=DefaultHistoryValue;

Where operator floorLog2 represent floor(Log 2(x)).

Floor(x)largest integer less than or equal to x. (6)

Log 2(x)base-2 logarithm of x. (7)

In yet other examples, default values for the history reset value can be expressed as function of QP, analytically, tabulated or some other way, signalled through the bitstream or provided as a side information. In some examples a linear model and/or non-linear operations such as clipping or clamping can be utilized, example is shown below:

DefaultHistoryRiceValue=(bitDepth−10)>0?(*int*)
(OFFSET−*cs*.slice→getSliceQp( )*MULTI-PLIER): 0;

DefaultHistoryRiceValue=DefaultHistoryRiceValue<0?0:
DefaultHistoryRiceValue;

StatCoeff[*i*][compID]=DefaultHistoryRiceValue;

In some examples, video decoder 300 may be configured to determine a default history value for history reset through a normative process or based on signaling in the bitstream.

In yet another example, with history being stored as transform coefficient or its derivation, default values for the history reset can be expressed through derivation process additional to described above, not limiting example of such method is shown below:

DefaultHistoryCoefValue=1<<DefaultHistoryRiceValue;

StatCoeff[*i*][compID]=DefaultHistoryCoefValue;

In some examples, video decoder 300 may perform a derivation process for a default history value based on a color component ID, or color format. For example, video decoder 300 may be configured to derive a history value for a chroma component as a function of history values for a luma component, such as through bitshift, scaling or offset.

Techniques for performing a history update will now be described. In some examples, with history being stored as Rice parameter, video decoder 300 can derive a value for updating the history from the Rice parameters which were utilized to decode certain group of coefficients, such as the last N coefficients, or coefficients located at the boundary of the block. An example of such an update is shown below:

*int* averageRiceInTU=(*int*)(g_tempStatCoeff[*i*]);

StatCoeff[*i*][compID]=(StatCoeff[*i*][compID]+averageRiceInTU)>>1;

In yet another example, video decoder 300 may derive a Rice estimate value for for history update from a decoded coefficients itself, as follows:

*int* rem=m_BinDecoder.decodeRemAbsEP(ricePar,
COEF_REMAIN_BIN_REDUCTION,
cctx.maxLog2TrDRange( ));

if((g_counterCollectStatCoeff[riceClass]>0)&&
(rem>0))

g_tempStatCoeff[riceClass]+=floorLog2((*uint32_t*)
rem);

In examples with history based on accumulating transform coefficient value, this value can be stored itself. In some examples, a derivation process for updating can take into consideration a value of the decoded coefficient by, for example, rejecting an update if a decoded value is equal to 0 or below some threshold T.

In yet another example, video decoder 300 may implement a derivation process that takes into consideration a spatial position of the decoded coefficient within a current TU, sub-block, or coding group. In some examples, video decoder 300 may be configured to not perform a history update for a decoded coefficient of the DC value. In some examples, the derivation process can be dependent on the spatial position, such that the derivation process is altered, or weighted, for coefficients that belong to certain sub-blocks (e.g., coding groups), such as for a coefficient within a sub-block that does not belong to the DC sub-block. In some examples, a single history counter can represent weighted history for all sub-blocks/classes of the coefficients.

In some examples, video decoder 300 may implement a derivation process for a history update value that takes into consideration a type of the decoded coefficient, such as whether the coefficient is partly coded through a context based method using significance or greter-than X flags, followed by the remainder coded with a bypass process that utilizes a Rice method, or if this coefficient is coded as an absolute value. In some examples, when history is based on storing Rice parameters, a Rice value for history update can be computed for partly context coded coefficient with offset N targeting to cover the context coded part of the coefficient:

g_tempStatCoeff[riceClass]+=floorLog2((*uint32_t*)
rem)+*N*;

In some examples, the value N in the equation above can be equal to an integer value, such as 1, 2, or another value.

In yet another example, when history is based on storing transform coefficient values, video decoder 300 may compute a value for history update for partly context coded coefficient through offset or scaling targeting to cover the context coded part of the coefficient:

g_tempStatCoeff[riceClass]+=rem<<<*M*;

Or g_tempStatCoeff[riceClass]+=rem+*X*;

In some examples, a value for N in the equation above can be equal to an integer value, such as 0, 1, 2, or another value.

Techniques with interpretable meaning of context coded syntax elements will now be described. In the proposal "AHG8: On significance, GT1, and GT2 flag coding for high bit depths," 23rd Meeting, by teleconference, 7-16 Jul. 2021 (JVET-W0093), a way to improve the coding of coefficients using context-coded bins in RRC for low (and negative) QPs for high bit depths was described. The effect of the technique was to shift left the significance, GT1, GT2, and parity tests used in regular residual coding by n bits.

Figure 4:
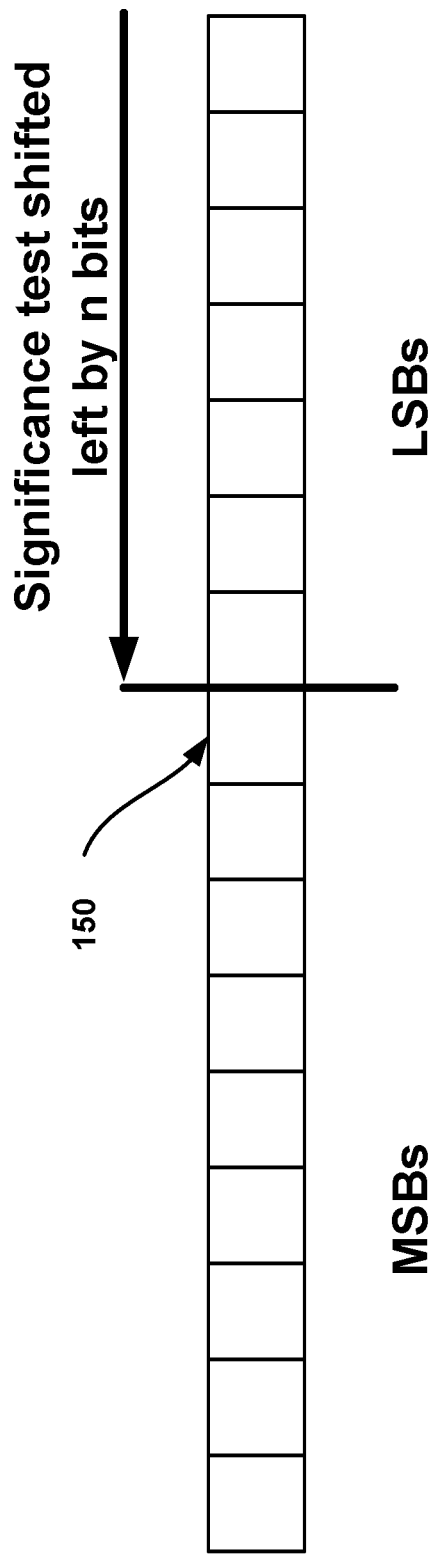
FIG. 4 shows an example of a left shift operation.

FIG. 4 and Table 2 below show an example of a left shift operation. Video decoder 300 may receive one or more flags including, for example, a SigMap flag, a GT1 flag, a GT2 flag, and a Parity flag. Video decoder 300 may then determine a value for a transform coefficient based on the one or more flags and based on the shift parameter. In the examples of FIG. 4 and Table 2, a shift of 0 corresponds to flags being interpreted in the manner set forth in VVC v1. In the example of FIG. 4, if n equals 7, then the first significant bit is the $7^{th}$ bit instead of the $0^{th}$ bit. Thus, a syntax that signifies if a value is greater than or equal to $2^0$ n VVC v1, signifies if the value is greater than or equal to $2^7$ when shifted by 7.

TABLE 2

| Shift | Sig Map | Flag GT1 | GT2 | Parity |
|---|---|---|---|---|
| 0 | value $\geq 1$ | value $\geq 2$ | value $\geq 4$ | (value & 1) $\neq$ 0 |
| 1 | value $\geq 2$ | value $\geq 4$ | value $\geq 8$ | (value & 2) $\neq$ 0 |
| 2 | value $\geq 4$ | value $\geq 8$ | value $\geq 16$ | (value & 4) $\neq$ 0 |
| ... | | | | |
| n | value $\geq 2^n$ | value $\geq 2^{n+1}$ | value $\geq 2^{n+2}$ | (value & $2^n$) $\neq$ 0 |

Two values of n (one each for luma and chroma) are signaled in the slice header as follows in clause 7.3.7 of the VVC Operation Range Extensions (Draft 4), JVET-W2005. Additions are shown between the markers <add> and </add>:

```
if(
sps_transform_skip_enabled_flag && !sh_dep_quant_used_flag &&
      !sh_sign_data_hiding_used_flag )
    sh_ts_residual_coding_disabled_flag                        u(1)
if( !sh_ts_residual_coding_disabled_flag &&
      sps_ts_residual_coding_rice_present_in_sh_flag )
    sh_ts_residual_coding_rice_idx_minus1                      u(3)
<add> slice_flagshift_luma</add>                               <add>u(4)</add>

<add> slice_flagshift_chroma</add>                             <add>u(4)</add> if( pps_slice_header_extension_present_flag ) {
    sh_slice_header_extension_length                           ue(v)
```

The techniques described in NET-W0093 specify that the interpretation of context coded flags be set once per slice and not changed during a slice decoding process. Such an approach may restrict or penalize performance of the process for coding pictures with signals of non-stationary processes, or variable within coded picture.

This disclosure proposes techniques to configure video encoder 200 and video decoder 300 to derive n shift parameters through an identical derivation process. It is proposed to derive a parameter prior to a block decoding using transform coefficients decoded in previous blocks, thus achieving block-level parameter adaptation without slice-level signaling. In some examples, video encoder 200 and video decoder 300 may be configured to derive the shift parameters from the history counters utilized to derive Rice parameters.

Examples of history usage will now be described. That is, video decoder 300 may determine transform coefficients for a first block of a slice and then derive a shift parameter for a second block of the slice based on the history, e.g., based on transform coefficients for the first block. In some examples, video encoder 200 and video decoder 300 may be configured to derive the parameter n shift from a history counter StatCoeff as follows:

$n$Shift=StatCoeff[class]

with variable class is being history index.

In some examples, with history for nShift derivation being maintained as a moving exponential average of decoded transform coefficients itself, instead of a codeword (Rice parameter), video encoder 200 and video decoder 300 may derive nShift as follows:

$n$Shift=floorLog2(StatCoeff[class]) or
    $n$Shift=ceilLog2(StatCoeff[class]).

The following pseudocode shows an example using nShift.

```
if (nShift > 0)
{
RExt_DECODER_DEBUG_BIT_STATISTICS_CREATE_SET_SIZE2( STATS_C
ABAC_BITS_LSB_BITS, tu.blocks[compID], compID );
    for (int i = 0; i < cctx.maxNumCoeff( ); i++)
    {
      TCoeff sign = 0;
      if (coeff[i] != 0)
      {
        sign = coeff[i] < 0 ? -1 : 1;
      }
      TCoeff lsbs = m_BinDecoder.decodeBinsEP(nShift);
      if (sign == 0 && lsbs > 0)
      {
        sign = m_BinDecoder.decodeBinEP( ) ? -1 : 1;
      }
      coeff[i] = sign * ((abs(coeff[i]) << nShift) + lsbs);
    }
}
```

In some examples, a class can be equal to color component Id, and video encoder 200 and video decoder 300 may be configured to share a history counter for nShift with Rice derivation history.

Class=componentId.

In some examples, class=comId+numComponents, and video encoder 200 and video decoder 300 may be configured to maintain a history counter for nShift that has and independent history counter in addition to maintaining a Rice derivation counter.

In some examples, video encoder 200 and video decoder 300 may derive a variable class as a function of block size of the block currently being decoded. In this example, video encoder 200 and video decoder 300 may maintain an independent counter for each block size or group of sizes.

class=tu·blocks[compID]·width*tu·blocks[compID]
·height>ADAPT_THRESHOLD?1:0;

With variable ADAPT_THRESHOLD being integer number, e.g. 16, 32, or other.

In some examples, video encoder 200 and video decoder 300 may be configured to derive the variable nShift from history and adjust the value using a non linear clipping process, as follows:

nShift=StatCoeff[class]

nShift=nShift<ADAPT_THRESHOLD2?0: nShift;

With variable ADAPT_THRESHOLD2 being integer number, e.g. 3 or other.

Another example technique for performing history update will now be described. In some examples, video encoder 200 and video decoder 300 may maintain a history for nShift derivation based on a Rice parameter, as opposed to, for example, based on coefficient values. An update value for the history can be derived from decoded transform coefficients of previous blocks, such as a certain group of coefficients or the last N coefficients, where N is integer value from 0 to number of coefficients in the decoded block. Video encoder 200 and video decoder 300 may be configured to implement an approach identical or similar to that utilized for Rice parameter derivation history, such as the example below.

codeLength=floorLog2((uint32_t)decodedCoef);

tempStatCoeff+=codeLength.

N++;

int averageRiceInTU=(int)(tempStatCoeff/N);

StatCoeff[compID]=(g_currentAdaptation[0]*StatCoeff[compID]+averageRiceInTU)>>g_currentAdaptation[1];

In the example above, video encoder 200 and video decoder 300 may maintain the history counter StatCoeff based on a Rice Parameter, Rice~floorLog2(tranCoef). The StatCoeff counter is updated through a weighted average of new information with current status of the counter, equivalent of w1=g currentAdaptation[0]*StatCoef and w2=1.

With variables g_currentAdaptation[2]={scale, shift} being parameters specifying speed adaptation. Examples of those parameters are scale=1 and shift=1 for fast update, and scale=3 and shift=2 for slow update, or other.

In some examples, selection of the adaptation parameters can be set depended as function of block size, and or bitdepth. Example of such selection is shown below.

```
{
  int adaptIdx = tu.blocks[compID].width * tu.blocks[compID].height > DMYTRO_ADAPT_THRESHOLD ? 1 : 0;
  g_currentAdaptation[0] = g_adaptationTable[adaptIdx][0];
  g_currentAdaptation[1] = g_adaptationTable[adaptIdx][1];
}
With g_adaptationTable = {{1,1},{3,2}} ;
```

In the example above, video encoder 200 and video decoder 300 may be configured to implement a speed of the history adaptation through a weighted average of new information with a current status of the history counter StatCoef, with w1=g_currentAdaptation[0] and w1+w2=2^g_currentAdaptation[1]. A separate adaptation speed may be maintained for different block sizes adaptIdx In some examples, with history for nShift derivation being maintained as moving exponential average of decoded transform coefficients itself, instead of codeword (Rice parameter): temp StatCoeff+=decodedCoef.

Another example technique for performing history update will now be described. In some examples, video encoder 200 and video decoder 300 may initiate a history for nShift derivation as a function of QP, such as in the example below:

StatCoeff=(qp<0)?(unsigned int)(-qp/6.0):0.

Figure 5:
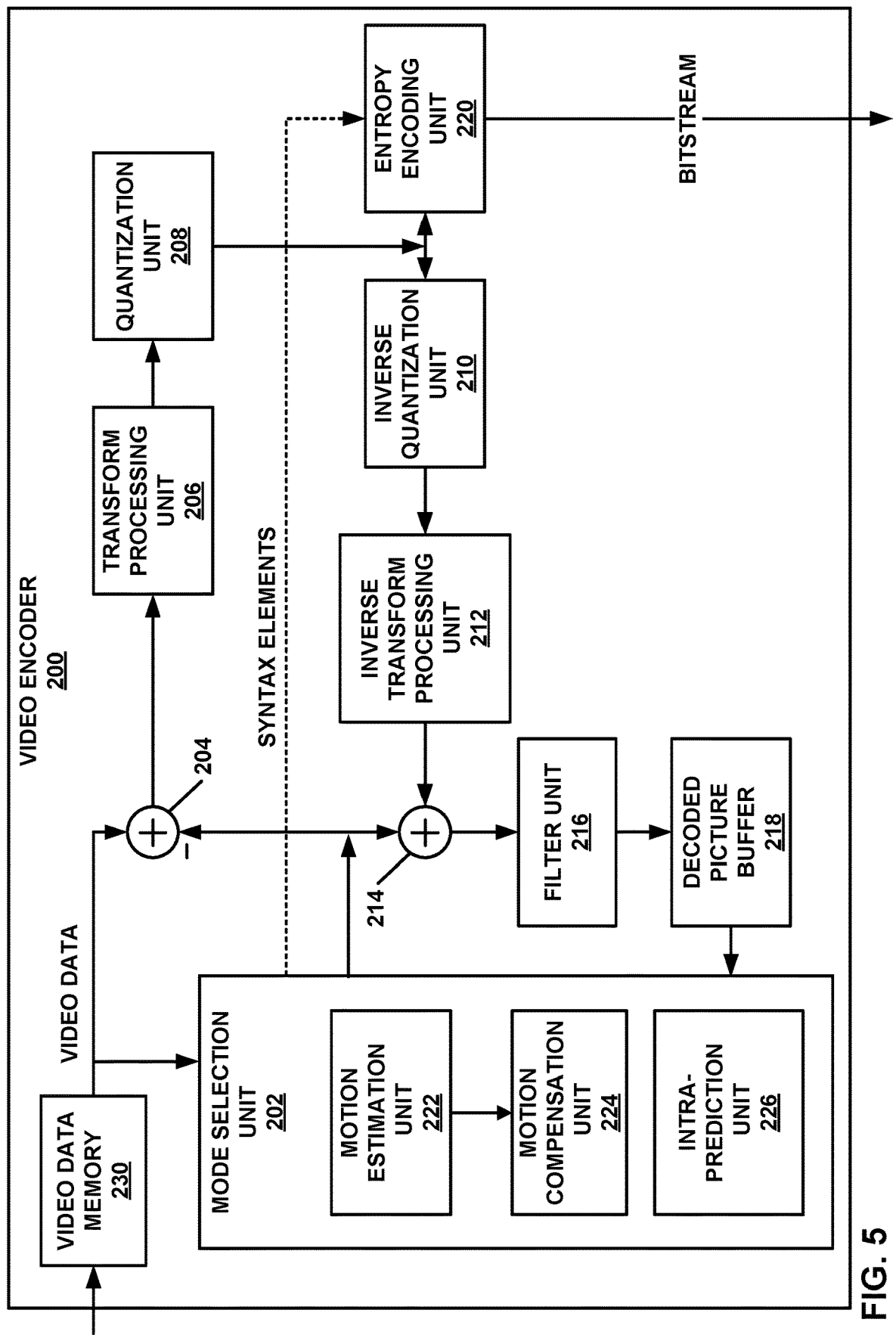
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 5 video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to derive, for a current block coded using transform coefficients, a value for a parameter based on transform coefficients determined for one or more previously coded blocks and determine a context for coding the transform coefficients of the current block based on the value for the parameter. Video encoder 200 also represents an example of a device configured to encode video data including a memory configured to store video data, and one or more processing units implemented in circuitry and configured to determine transform coefficients for a first block of a slice; derive a shift parameter for a second block of the slice based on values of the transform coefficients for the first block; receive one or more flags; determine a transform coefficient for the second block based on the one or more flags and based on the shift parameter; and output a decoded version of the second block based on the determined transform coefficient.

Figure 6:
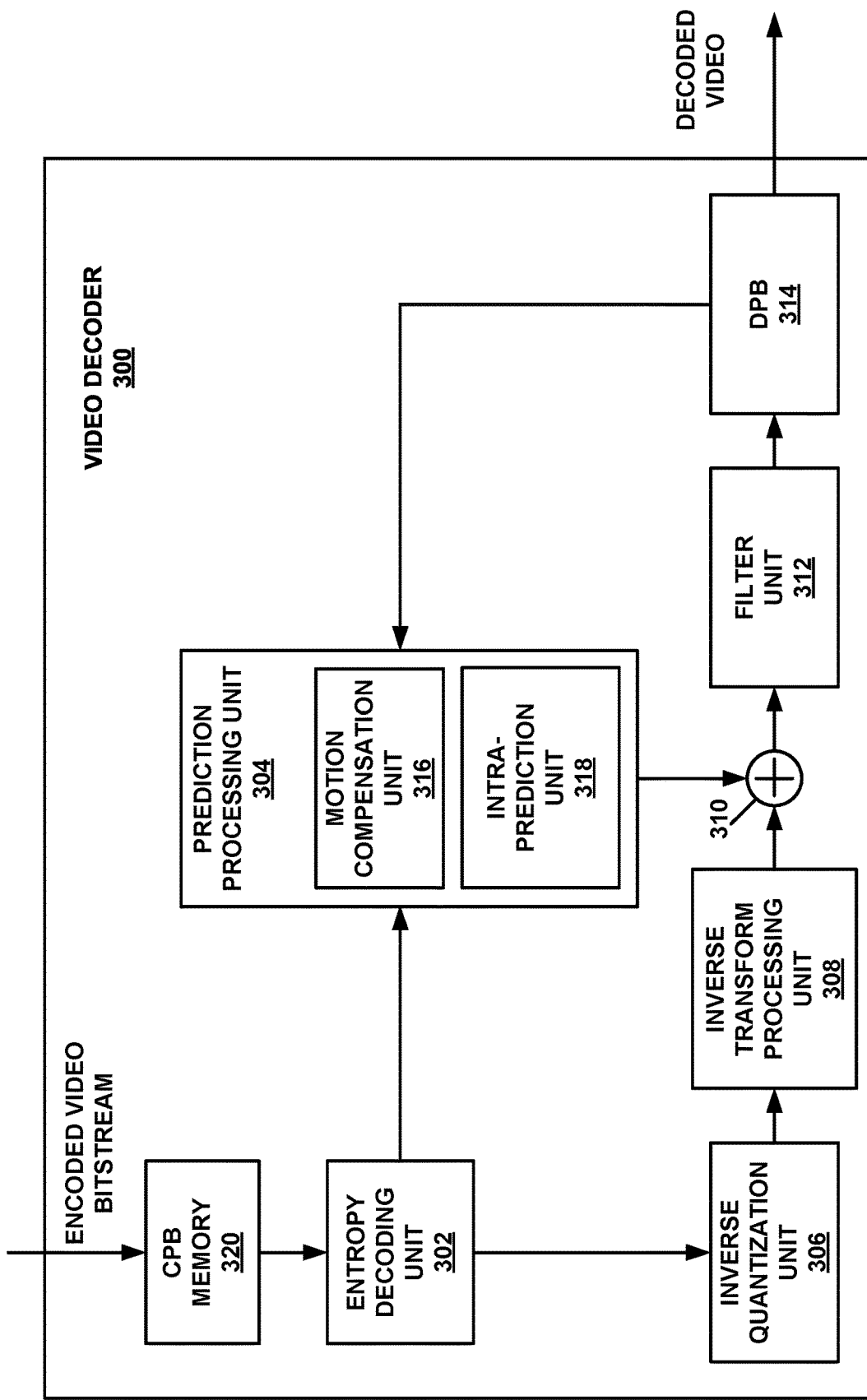
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to derive, for a current block coded using transform coefficients, a value for a parameter based on transform coefficients determined for one or more previously coded blocks and determine a context for coding the transform coefficients of the current block based on the value for the parameter. Video decoder 300 also represents an example of a device configured to decode video data including a memory configured to store video data, and one or more processing units implemented in circuitry and configured to determine transform coefficients for a first block of a slice; derive a shift parameter for a second block of the slice based on values of the transform coefficients for the first block; receive one or more flags; determine a transform coefficient for the second block based on the one or more flags and based on the shift parameter; and output a decoded version of the second block based on the determined transform coefficient.

Figure 7:
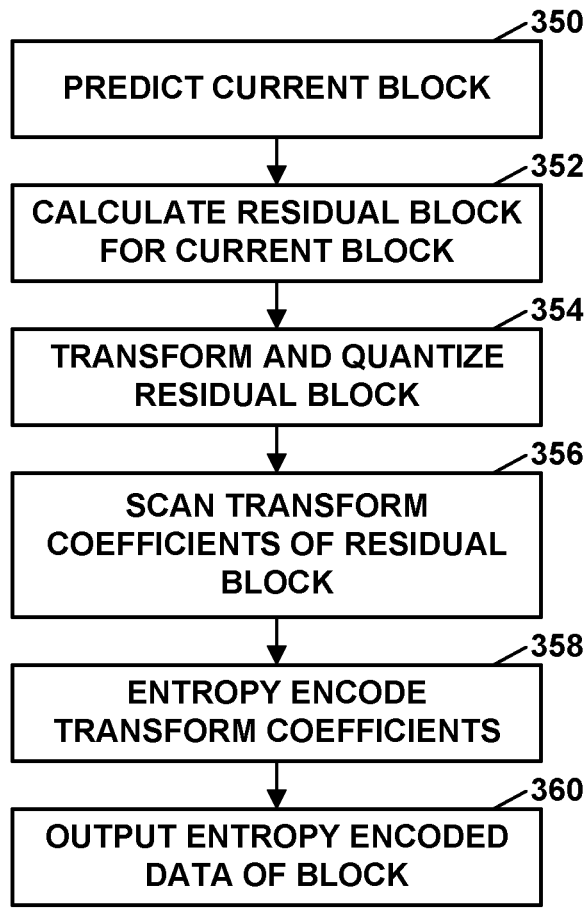
FIG. 7 is a flowchart illustrating an example process for encoding a current block in accordance with the techniques of this disclosure.

FIG. 7 is a flowchart illustrating an example process for encoding a current block in accordance with the techniques of this disclosure. The current block may be a current CU. Although described with respect to video encoder 200 (FIGS. 1 and 4), it should be understood that other devices may be configured to perform a process similar to that of FIG. 7.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may, for example, generate a series of significance and greater than X flags as described above, and the meaning of these flags may be dependent upon a derived shift parameter. Video encoder 200 may then output the entropy encoded data of the block (360).

Figure 8:
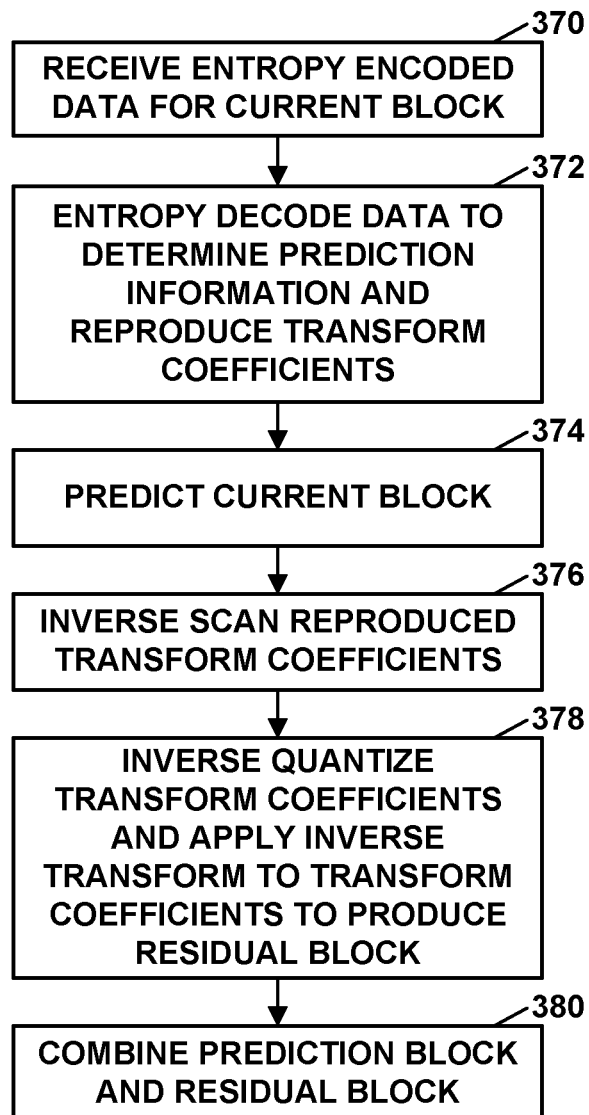
FIG. 8 is a flowchart illustrating an example process for decoding a current block in accordance with the techniques of this disclosure.

FIG. 8 is a flowchart illustrating an example process for decoding a current block of video data in accordance with the techniques of this disclosure. The current block may be a current CU. Although described with respect to video decoder 300 (FIGS. 1 and 5), it should be understood that other devices may be configured to perform a process similar to that of FIG. 8.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). As part of reproducing the transform coefficients, video decoder 300 may, for example, receive a series of significance and greater than X flags as described above, and derive a shift parameter for decoding these flags. Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 9:
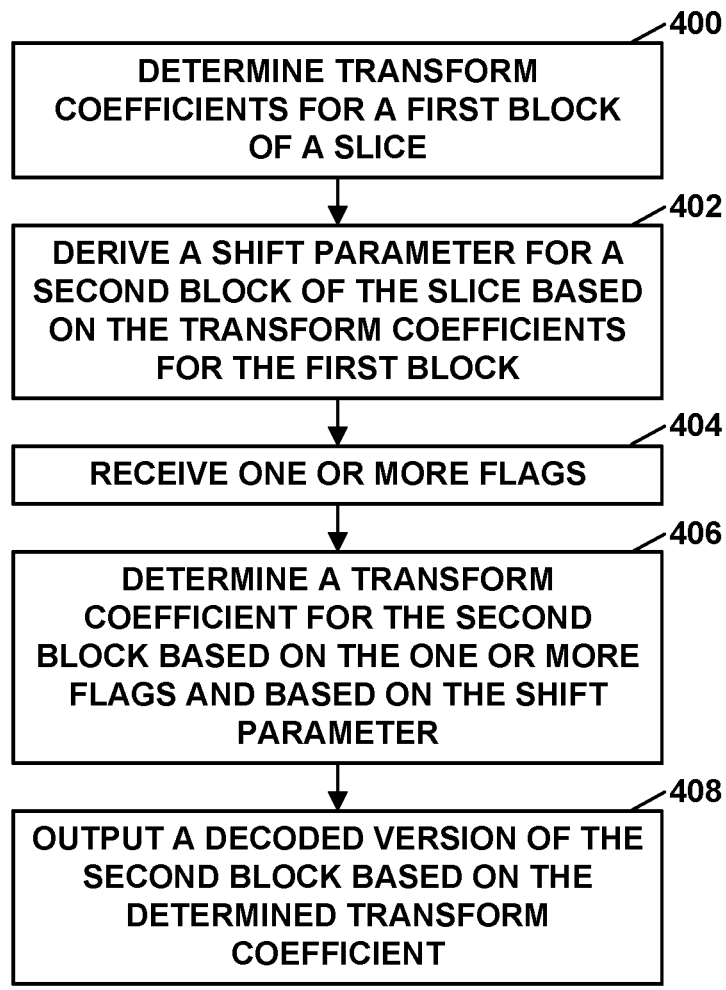
FIG. 9 is a flowchart illustrating an example process for decoding a current block in accordance with the techniques of this disclosure.

FIG. 9 is a flowchart illustrating an example process for decoding a current block of video data in accordance with the techniques of this disclosure. The current block may be a current CU. The techniques of FIG. 9 will be described with respect to a generic video decoder, which may, for example, correspond to video decoder 300 (FIGS. 1 and 5) or the video decoding loop of video encoder 200 (FIGS. 1 and 4).

In the example of FIG. 9, the video decoder determines transform coefficients for a first block of a slice (400). The video decoder derives a shift parameter for a second block of the slice based on the transform coefficients for the first block (402). To derive the shift parameter for the second block of the slice based on the transform coefficients for the first block, the video decoder may be further configured to derive the shift parameter for the second block of the slice based on values of the transform coefficients for the first block. To derive the shift parameter for the second block of the slice based on the transform coefficients for the first block, the video decoder may be further configured to derive the shift parameter for the second block of the slice based on a Rice parameter for the transform coefficients for the first block.

The shift parameter for the second block of the slice may, for example, be a second shift parameter, and the video decoder may be further configured to determine a first shift parameter for the first block of the slice and determine the transform coefficients for the first block of the slice based on the first shift parameter. The first shift parameter may be different than the second shift parameter. To derive the shift parameter for the second block of the slice based on the values of the transform coefficients for the first block, the video decoder may be configured to derive the shift parameter for the second block of the slice without receiving explicit signaling indicating a value for the shift parameter. To derive the shift parameter for the second block of the slice based on values of the transform coefficients for the first block, the video decoder may be configured to determine a moving average for values of previously decoded transform coefficients in previously decoded blocks of the slice, wherein the previously decoded transform coefficients are collocated with respect to the transform coefficient and determine the shift parameter based on the moving average.

The video decoder receives one or more flags (404). The video decoder determines a transform coefficient for the second block based on the one or more flags and based on the shift parameter (406). To determine the transform coefficient for the second block based on the one or more flags and based on the shift parameter, the video decoder may be configured to determine the shift parameter to be equal to N, wherein N is greater than 2 and in response to determining that the shift parameter is equal to N, receive a first flag, a second flag, and a third flag. The first flag indicates whether the transform coefficient is greater than or equal to 4, and the second flag indicates whether the transform coefficient is greater than or equal to 8. The third flag indicates whether the transform coefficient is greater than or equal to 16. To determine the transform coefficient for the second block based on the one or more flags and based on the shift parameter, the video decoder may be configured to determine the shift parameter to be equal to N, wherein N is greater than 2 and in response to determining that the shift parameter is equal to N, receive a first flag, a second flag, and a third flag, wherein the first flag indicates whether the transform coefficient is greater than or equal to $2^N$, wherein the second flag indicates whether the transform coefficient is greater than or equal to $2^{N+1}$, and wherein the third flag indicates whether the transform coefficient is greater than or equal to $2^{N+2}$.

The video decoder may be further configured to determine a block of residual values for the second block based on the transform coefficient and determine the decoded version of the second block based on the block residual values. The video decoder may add the block of residual values to a prediction block to form a reconstructed block and apply one or more filters to the reconstructed block.

The video decoder outputs a decoded version of the second block based on the determined transform coefficient (408). To output the decoded version of the second block, the video decoder may, for example, store a decoded picture including the block in a memory or output the decoded picture for display.

The following numbered clauses illustrate one or more aspects of the devices and techniques described in this disclosure.

Clause 1A. A method of coding video data, the method comprising: for a current block coded using transform coefficients, deriving a value for a parameter based on transform coefficients determined for one or more previously coded blocks; and determining a context for coding the transform coefficients of the current block based on the value for the parameter.

Clause 2A. The method of clause 1A, wherein the current block and the one or more previously coded blocks belong to a same slice of the video data.

Clause 3A. The method of clauses 1A or 2A, wherein coding the transform coefficients of the current block based on the value for the parameter comprises coding one or more of a significance flag, a greater than one flag, or a greater than 2 flag for a transform coefficient of the transform coefficients.

Clause 4A. The method of any of clauses 1A-3A, wherein coding comprises decoding.

Clause 5A. The method of any of clauses 1A-3A, wherein coding comprises encoding.

Clause 6A. A device for coding video data, the device comprising one or more means for performing the method of any of clauses 1A-5A.

Clause 7A. The device of clause 6, wherein the one or more means comprise one or more processors implemented in circuitry.

Clause 8A. The device of any of clauses 6A and 7A, further comprising a memory to store the video data.

Clause 9A. The device of any of clauses 6A-8A, further comprising a display configured to display decoded video data.

Clause 10A. The device of any of clauses 6A-9A, wherein the device comprises one or more of a camera, a computer, a mobile device, a broadcast receiver device, or a set-top box.

Clause 11A. The device of any of clauses 6A-10A, wherein the device comprises a video decoder.

Clause 12A. The device of any of clauses 6A-10A, wherein the device comprises a video encoder.

Clause 13A. A computer-readable storage medium having stored thereon instructions that, when executed, cause one or more processors to perform the method of any of clauses 1A-4A.

Clause 1B. A method of decoding video data, the method comprising: determining transform coefficients for a first block of a slice; deriving a shift parameter for a second block of the slice based on the transform coefficients for the first block; receiving one or more flags; determining a value for the transform coefficient for the second block based on the one or more flags and based on the shift parameter; and outputting a decoded version of the second block based on the determined transform coefficient.

Clause 2B. The method of clause 1B, wherein deriving the shift parameter for the second block of the slice based on the transform coefficients for the first block comprises deriving the shift parameter for the second block of the slice based on values of the transform coefficients for the first block.

Clause 3B. The method of clause 1B, wherein deriving the shift parameter for the second block of the slice based on the transform coefficients for the first block comprises deriving the shift parameter for the second block of the slice based on a Rice parameter for the transform coefficients for the first block.

Clause 4B. The method of clause 1B, wherein the shift parameter for the second block of the slice comprises a second shift parameter, the method further comprising: determining a first shift parameter for the first block of the slice; determining the transform coefficients for the first block of the slice based on the first shift parameter, wherein the first shift parameter is different than the second shift parameter.

Clause 5B. The method of clause 1B, wherein deriving the shift parameter for the second block of the slice based on the values of the transform coefficients for the first block comprises deriving the shift parameter for the second block of the slice without receiving explicit signaling indicating a value for the shift parameter.

Clause 6B. The method of clause 1B, wherein determining the transform coefficient for the second block based on the one or more flags and based on the shift parameter comprises: determining the shift parameter to be equal to N, wherein N is greater than 2; in response to determining that the shift parameter is equal to N, receiving a first flag, a second flag, and a third flag, wherein the first flag indicates whether the transform coefficient is greater than or equal to 4, wherein the second flag indicates whether the transform coefficient is greater than or equal to 8, and wherein the third flag indicates whether the transform coefficient is greater than or equal to 16.

Clause 7B. The method of clause 1B, wherein determining the transform coefficient for the second block based on the one or more flags and based on the shift parameter comprises: determining the shift parameter to be equal to N, wherein N is greater than 2; in response to determining that the shift parameter is equal to N, receiving a first flag, a second flag, and a third flag, wherein the first flag indicates whether the transform coefficient is greater than or equal to $2^N$, wherein the second flag indicates whether the transform coefficient is greater than or equal to $2^{N+1}$ and wherein the third flag indicates whether the transform coefficient is greater than or equal to $2^{N+2}$.

Clause 8B. The method of clause 1B, wherein deriving the shift parameter for the second block of the slice based on the transform coefficients for the first block comprises: determining a moving average for values of previously decoded transform coefficients in previously decoded blocks of the slice, wherein the previously decoded transform coefficients are collocated with respect to the transform coefficient; determining the shift parameter based on the moving average.

Clause 9B. The method of clause 1B, further comprising: determining a block of residual values for the second block based on the transform coefficient; and determining the decoded version of the second block based on the block residual values.

Clause 10B. The method of clause 1B, wherein the video data has a bit depth greater than 8.

Clause 11B. The method of clause 1B, wherein the video data has a bit depth greater than 10.

Clause 12B. A device for decoding video data, the device comprising: a memory configured to store video data; one or more processors implemented in circuitry and configured to: determine transform coefficients for a first block of a slice; derive a shift parameter for a second block of the slice based on the transform coefficients for the first block; receive one or more flags; determine a transform coefficient for the second block based on the one or more flags and based on the shift parameter; and output a decoded version of the second block based on the determined transform coefficient.

Clause 13B. The device of clause 12B, wherein to derive the shift parameter for the second block of the slice based on the transform coefficients for the first block, the one or more processors are further configured to derive the shift parameter for the second block of the slice based on values of the transform coefficients for the first block.

Clause 14B. The device of clause 12B, wherein to derive the shift parameter for the second block of the slice based on the transform coefficients for the first block, the one or more processors are further configured to derive the shift parameter for the second block of the slice based on a Rice parameter for the transform coefficients for the first block.

Clause 15B. The device of clause 12B, wherein the shift parameter for the second block of the slice comprises a second shift parameter, and wherein the one or more processors are further configured to: determine a first shift parameter for the first block of the slice; determine the transform coefficients for the first block of the slice based on the first shift parameter, wherein the first shift parameter is different than the second shift parameter.

Clause 16B. The device of clause 12B, wherein to derive the shift parameter for the second block of the slice based on the values of the transform coefficients for the first block, the one or more processors are further configured to derive the shift parameter for the second block of the slice without receiving explicit signaling indicating a value for the shift parameter.

Clause 17B. The device of clause 12B, wherein to determine the transform coefficient for the second block based on the one or more flags and based on the shift parameter, the one or more processors are further configured to: determine the shift parameter to be equal to N, wherein N is greater than 2; in response to determining that the shift parameter is equal to N, receive a first flag, a second flag, and a third flag, wherein the first flag indicates whether the transform coefficient is greater than or equal to 4, wherein the second flag indicates whether the transform coefficient is greater than or equal to 8, and wherein the third flag indicates whether the transform coefficient is greater than or equal to 16.

Clause 18B. The device of clause 12B, wherein to determine the transform coefficient for the second block based on the one or more flags and based on the shift parameter, the one or more processors are further configured to: determine the shift parameter to be equal to N, wherein N is greater than 2; in response to determining that the shift parameter is equal to N, receive a first flag, a second flag, and a third flag, wherein the first flag indicates whether the transform coefficient is greater than or equal to $2^N$, wherein the second flag indicates whether the transform coefficient is greater than or equal to $2^{N+1}$ and wherein the third flag indicates whether the transform coefficient is greater than or equal to $2^{N+2}$.

Clause 19B. The device of clause 12B, wherein to derive the shift parameter for the second block of the slice based on the transform coefficients for the first block, the one or more processors are further configured to: determine a moving average for values of previously decoded transform coefficients in previously decoded blocks of the slice, wherein the previously decoded transform coefficients are collocated with respect to the transform coefficient; determine the shift parameter based on the moving average.

Clause 20B. The device of clause 12B, wherein the one or more processors are further configured to: determine a block of residual values for the second block based on the transform coefficient; and determine the decoded version of the second block based on the block residual values.

Clause 21B. The device of clause 12B, wherein the video data has a bit depth greater than 8.

Clause 22B. The device of clause 12B, wherein the device comprises a wireless communication device, further comprising a receiver configured to receive encoded video data.

Clause 23B. The device of clause 22B, wherein the wireless communication device comprises a telephone handset and wherein the receiver is configured to demodulate, according to a wireless communication standard, a signal comprising the encoded video data.

Clause 24B. The device of clause 22B, further comprising: a display configured to display decoded video data.

Clause 25B. The device of clause 22B, wherein the device comprises one or more of a camera, a computer, a mobile device, a broadcast receiver device, or a set-top box.

Clause 26B. A computer-readable storage medium storing instructions that when executed by one or more processors cause the one or more processors to: determine transform coefficients for a first block of a slice; derive a shift parameter for a second block of the slice based on the transform coefficients for the first block; receive one or more flags; determine a transform coefficient for the second block based on the one or more flags and based on the shift parameter; and output a decoded version of the second block based on the determined transform coefficient.

Clause 27B. The computer-readable storage medium of clause 26B, wherein to determine the transform coefficient for the second block based on the one or more flags and based on the shift parameter the instructions cause the one or more processors to: determine the shift parameter to be equal to N, wherein N is greater than 2; in response to determining that the shift parameter is equal to N, receive a first flag, a second flag, and a third flag, wherein the first flag indicates whether the transform coefficient is greater than or equal to 4, wherein the second flag indicates whether the transform coefficient is greater than or equal to 8, and wherein the third flag indicates whether the transform coefficient is greater than or equal to 16.

Clause 28B. The computer-readable storage medium of clause 26B, wherein to determine the transform coefficient for the second block based on the one or more flags and based on the shift parameter the instructions cause the one or more processors to: determine the shift parameter to be equal to N, wherein N is greater than 2; in response to determining that the shift parameter is equal to N, receive a first flag, a second flag, and a third flag, wherein the first flag indicates whether the transform coefficient is greater than or equal to $2^N$, wherein the second flag indicates whether the transform coefficient is greater than or equal to $2^{N+1}$ and wherein the third flag indicates whether the transform coefficient is greater than or equal to $2^{N+2}$.

Clause 29B. A device for encoding video data, the device comprising: a memory configured to store video data and one or more processors implemented in circuitry and configured to: determine transform coefficients for a first block of a slice; derive a shift parameter for a second block of the slice based on the transform coefficients for the first block; determine a value for a transform coefficient for the second block; determine values for one or more flags based on the value for the transform coefficient and the shift parameter; and output a bitstream of encoded video data that includes the one or more flags.

Clause 30B. The device of clause 29B, wherein to derive the shift parameter for the second block of the slice based on the transform coefficients for the first block, the one or more processors are further configured to derive the shift parameter for the second block of the slice based on values of the transform coefficients for the first block.

Clause 1C. A method of decoding video data, the method comprising: determining transform coefficients for a first block of a slice; deriving a shift parameter for a second block of the slice based on the transform coefficients for the first block; receiving one or more flags; determining a value for the transform coefficient for the second block based on the one or more flags and based on the shift parameter; and outputting a decoded version of the second block based on the determined transform coefficient.

Clause 2C. The method of clause 1C, wherein deriving the shift parameter for the second block of the slice based on the transform coefficients for the first block comprises deriving the shift parameter for the second block of the slice based on values of the transform coefficients for the first block.

Clause 3C. The method of clause 1C, wherein deriving the shift parameter for the second block of the slice based on the transform coefficients for the first block comprises deriving the shift parameter for the second block of the slice based on a Rice parameter for the transform coefficients for the first block.

Clause 4C. The method of clause 1C, wherein the shift parameter for the second block of the slice comprises a second shift parameter, the method further comprising: determining a first shift parameter for the first block of the slice; determining the transform coefficients for the first block of the slice based on the first shift parameter, wherein the first shift parameter is different than the second shift parameter.

Clause 5C. The method of clause 1C, wherein deriving the shift parameter for the second block of the slice based on the values of the transform coefficients for the first block comprises deriving the shift parameter for the second block of the slice without receiving explicit signaling indicating a value for the shift parameter.

Clause 6C. The method of clause 1C, wherein determining the transform coefficient for the second block based on the one or more flags and based on the shift parameter comprises: determining the shift parameter to be equal to N, wherein N is greater than 2; in response to determining that the shift parameter is equal to N, receiving a first flag, a second flag, and a third flag, wherein the first flag indicates whether the transform coefficient is greater than or equal to 4, wherein the second flag indicates whether the transform coefficient is greater than or equal to 8, and wherein the third flag indicates whether the transform coefficient is greater than or equal to 16.

Clause 7C. The method of clause 1C, wherein determining the transform coefficient for the second block based on the one or more flags and based on the shift parameter comprises: determining the shift parameter to be equal to N, wherein N is greater than 2; in response to determining that the shift parameter is equal to N, receiving a first flag, a second flag, and a third flag, wherein the first flag indicates whether the transform coefficient is greater than or equal to $2^N$, wherein the second flag indicates whether the transform coefficient is greater than or equal to $2^{N+1}$ and wherein the third flag indicates whether the transform coefficient is greater than or equal to $2^{N+2}$.

Clause 8C. The method of clause 1C, wherein deriving the shift parameter for the second block of the slice based on the transform coefficients for the first block comprises: determining a moving average for values of previously decoded transform coefficients in previously decoded blocks of the slice, wherein the previously decoded transform coefficients are collocated with respect to the transform coefficient; determining the shift parameter based on the moving average.

Clause 9C. The method of clause 1C, further comprising: determining a block of residual values for the second block based on the transform coefficient; and determining the decoded version of the second block based on the block residual values.

Clause 10C. The method of clause 1C, wherein the video data has a bit depth greater than 8.

Clause 11C. The method of clause 1C, wherein the video data has a bit depth greater than 10.

Clause 12C. A device for decoding video data, the device comprising: a memory configured to store video data; one or more processors implemented in circuitry and configured to: determine transform coefficients for a first block of a slice; derive a shift parameter for a second block of the slice based on the transform coefficients for the first block; receive one or more flags; determine a transform coefficient for the second block based on the one or more flags and based on the shift parameter; and output a decoded version of the second block based on the determined transform coefficient.

Clause 13C. The device of clause 12C, wherein to derive the shift parameter for the second block of the slice based on the transform coefficients for the first block, the one or more processors are further configured to derive the shift parameter for the second block of the slice based on values of the transform coefficients for the first block.

Clause 14C. The device of clause 12C, wherein to derive the shift parameter for the second block of the slice based on the transform coefficients for the first block, the one or more processors are further configured to derive the shift parameter for the second block of the slice based on a Rice parameter for the transform coefficients for the first block.

Clause 15C. The device of clause 12C, wherein the shift parameter for the second block of the slice comprises a second shift parameter, and wherein the one or more processors are further configured to: determine a first shift parameter for the first block of the slice; determine the transform coefficients for the first block of the slice based on the first shift parameter, wherein the first shift parameter is different than the second shift parameter.

Clause 16C. The device of clause 12C, wherein to derive the shift parameter for the second block of the slice based on the values of the transform coefficients for the first block, the one or more processors are further configured to derive the shift parameter for the second block of the slice without receiving explicit signaling indicating a value for the shift parameter.

Clause 17C. The device of clause 12C, wherein to determine the transform coefficient for the second block based on the one or more flags and based on the shift parameter, the one or more processors are further configured to: determine the shift parameter to be equal to N, wherein N is greater than 2; in response to determining that the shift parameter is equal to N, receive a first flag, a second flag, and a third flag, wherein the first flag indicates whether the transform coefficient is greater than or equal to 4, wherein the second flag indicates whether the transform coefficient is greater than or equal to 8, and wherein the third flag indicates whether the transform coefficient is greater than or equal to 16.

Clause 18C. The device of clause 12C, wherein to determine the transform coefficient for the second block based on the one or more flags and based on the shift parameter, the one or more processors are further configured to: determine the shift parameter to be equal to N, wherein N is greater than 2; in response to determining that the shift parameter is equal to N, receive a first flag, a second flag, and a third flag, wherein the first flag indicates whether the transform coefficient is greater than or equal to $2^N$, wherein the second flag indicates whether the transform coefficient is greater than or equal to $2^{N+1}$ and wherein the third flag indicates whether the transform coefficient is greater than or equal to $2^{N+2}$.

Clause 19C. The device of clause 12C, wherein to derive the shift parameter for the second block of the slice based on the transform coefficients for the first block, the one or more processors are further configured to: determine a moving average for values of previously decoded transform coefficients in previously decoded blocks of the slice, wherein the previously decoded transform coefficients are collocated with respect to the transform coefficient; determine the shift parameter based on the moving average.

Clause 20C. The device of clause 12C, wherein the one or more processors are further configured to: determine a block of residual values for the second block based on the transform coefficient; and determine the decoded version of the second block based on the block residual values.

Clause 21C. The device of clause 12C, wherein the video data has a bit depth greater than 8.

Clause 22C. The device of clause 12C, wherein the device comprises a wireless communication device, further comprising a receiver configured to receive encoded video data.

Clause 23C. The device of clause 22C, wherein the wireless communication device comprises a telephone handset and wherein the receiver is configured to demodulate, according to a wireless communication standard, a signal comprising the encoded video data.

Clause 24C. The device of clause 22C, further comprising: a display configured to display decoded video data.

Clause 25C. The device of clause 22C, wherein the device comprises one or more of a camera, a computer, a mobile device, a broadcast receiver device, or a set-top box.

Clause 26C. A computer-readable storage medium storing instructions that when executed by one or more processors cause the one or more processors to: determine transform coefficients for a first block of a slice; derive a shift parameter for a second block of the slice based on the transform coefficients for the first block; receive one or more flags; determine a transform coefficient for the second block based on the one or more flags and based on the shift parameter; and output a decoded version of the second block based on the determined transform coefficient.

Clause 27C. The computer-readable storage medium of clause 26C, wherein to determine the transform coefficient for the second block based on the one or more flags and based on the shift parameter the instructions cause the one or more processors to: determine the shift parameter to be equal to N, wherein N is greater than 2; in response to determining that the shift parameter is equal to N, receive a first flag, a second flag, and a third flag, wherein the first flag indicates whether the transform coefficient is greater than or equal to 4, wherein the second flag indicates whether the transform coefficient is greater than or equal to 8, and wherein the third flag indicates whether the transform coefficient is greater than or equal to 16.

Clause 28C. The computer-readable storage medium of clause 26C, wherein to determine the transform coefficient for the second block based on the one or more flags and based on the shift parameter the instructions cause the one or more processors to: determine the shift parameter to be equal to N, wherein N is greater than 2; in response to determining that the shift parameter is equal to N, receive a first flag, a second flag, and a third flag, wherein the first flag indicates whether the transform coefficient is greater than or equal to $2^N$, wherein the second flag indicates whether the transform coefficient is greater than or equal to $2^{N+1}$ and wherein the third flag indicates whether the transform coefficient is greater than or equal to $2^{N+2}$.

Clause 29C. A device for encoding video data, the device comprising: a memory configured to store video data; one or more processors implemented in circuitry and configured to: determine transform coefficients for a first block of a slice; derive a shift parameter for a second block of the slice based on the transform coefficients for the first block; determine a value for a transform coefficient for the second block; determine values for one or more flags based on the value for the transform coefficient and the shift parameter; and output a bitstream of encoded video data that includes the one or more flags.

Clause 30C. The device of clause 29C, wherein to derive the shift parameter for the second block of the slice based on the transform coefficients for the first block, the one or more processors are further configured to derive the shift parameter for the second block of the slice based on values of the transform coefficients for the first block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining transform coefficients for a first block of a slice;
   deriving a shift parameter for a second block of the slice based on the transform coefficients for the first block, wherein deriving the shift parameter for the second block of the slice based on the transform coefficients for the first block comprises deriving the shift parameter for the second block of the slice without receiving explicit signaling indicating a value for the shift parameter, wherein the value for the shift parameter is equal to an integer value N, wherein N is greater than or equal to 0;
   receiving one or more flags for a transform coefficient for the second block, wherein the one or more flags are based on the transform coefficients for the first block;
   determining a value for the transform coefficient for the second block based on the one or more flags and based on the shift parameter, wherein determining the value for the transform coefficient for the second block based on the one or more flags and based on the shift parameter comprises:
      determining whether the transform coefficient is greater than or equal to $2^N$ based on a value of a first flag;
      determining whether the transform coefficient is greater than or equal to $2^{N+1}$ based on a value of a second flag; and
      determining whether the transform coefficient is greater than or equal to $2^{N+2}$ based on a value for a third flag; and
   outputting a decoded version of the second block based on the determined value for the transform coefficient.

2. The method of claim 1, wherein deriving the shift parameter for the second block of the slice based on the transform coefficients for the first block comprises deriving the shift parameter for the second block of the slice based on values of the transform coefficients for the first block.

3. The method of claim 1, wherein deriving the shift parameter for the second block of the slice based on the transform coefficients for the first block comprises deriving the shift parameter for the second block of the slice based on a Rice parameter for the transform coefficients for the first block.

4. The method of claim 1, wherein the shift parameter for the second block of the slice comprises a second shift parameter, the method further comprising:
   determining a first shift parameter for the first block of the slice; and
   determining the transform coefficients for the first block of the slice based on the first shift parameter, wherein the first shift parameter is different than the second shift parameter.

5. The method of claim 1, wherein deriving the shift parameter for the second block of the slice based on the transform coefficients for the first block comprises:
   determining a moving average for values of previously decoded transform coefficients in previously decoded blocks of the slice, wherein the previously decoded transform coefficients are collocated with respect to the transform coefficient; and
   determining the shift parameter based on the moving average.

6. The method of claim 1, further comprising:
determining a block of residual values for the second block based on the transform coefficient; and
determining the decoded version of the second block based on the block residual values.

7. The method of claim 1, wherein the video data has a bit depth greater than 8.

8. The method of claim 1, wherein the video data has a bit depth greater than 10.

9. A device for decoding video data, the device comprising:
a memory configured to store video data;
one or more processors implemented in circuitry and configured to:
determine transform coefficients for a first block of a slice;
derive a shift parameter for a second block of the slice based on the transform coefficients for the first block, wherein to derive the shift parameter for the second block of the slice based on the transform coefficients for the first block, the one or more processors are further configured to derive the shift parameter for the second block of the slice without receiving explicit signaling indicating a value for the shift parameter, wherein the value for the shift parameter is equal to an integer value N, wherein N is greater than or equal to 0;
receive one or more flags for a transform coefficient for the second block;
determine a value for the transform coefficient for the second block based on the one or more flags and based on the shift parameter, wherein to determine the value for the transform coefficient for the second block based on the one or more flags and based on the shift parameter, the one or more processors are further configured to:
determine whether the transform coefficient is greater than or equal to $2^N$ based on a value of a first flag;
determine whether the transform coefficient is greater than or equal to $2^{N+1}$ based on a value of a second flag; and
determine whether the transform coefficient is greater than or equal to $2^{N+2}$ based on a value for a third flag; and
output a decoded version of the second block based on the determined value for the transform coefficient.

10. The device of claim 9, wherein to derive the shift parameter for the second block of the slice based on the transform coefficients for the first block, the one or more processors are further configured to derive the shift parameter for the second block of the slice based on values of the transform coefficients for the first block.

11. The device of claim 9, wherein to derive the shift parameter for the second block of the slice based on the transform coefficients for the first block, the one or more processors are further configured to derive the shift parameter for the second block of the slice based on a Rice parameter for the transform coefficients for the first block.

12. The device of claim 9, wherein the shift parameter for the second block of the slice comprises a second shift parameter, and wherein the one or more processors are further configured to:
determine a first shift parameter for the first block of the slice; and
determine the transform coefficients for the first block of the slice based on the first shift parameter, wherein the first shift parameter is different than the second shift parameter.

13. The device of claim 9, wherein to derive the shift parameter for the second block of the slice based on the transform coefficients for the first block, the one or more processors are further configured to:
determine a moving average for values of previously decoded transform coefficients in previously decoded blocks of the slice, wherein the previously decoded transform coefficients are collocated with respect to the transform coefficient; and
determine the shift parameter based on the moving average.

14. The device of claim 9, wherein the one or more processors are further configured to:
determine a block of residual values for the second block based on the transform coefficient; and
determine the decoded version of the second block based on the block residual values.

15. The device of claim 9, wherein the video data has a bit depth greater than 8.

16. The device of claim 9, wherein the device comprises a wireless communication device, further comprising a receiver configured to receive the video data.

17. The device of claim 16, wherein the wireless communication device comprises a telephone handset and wherein the receiver is configured to demodulate, according to a wireless communication standard, a signal comprising the video data.

18. The device of claim 16, further comprising:
a display configured to display decoded video data.

19. The device of claim 16, wherein the device comprises one or more of a camera, a computer, a mobile device, a broadcast receiver device, or a set-top box.

20. A computer-readable storage medium storing instructions that when executed by one or more processors cause the one or more processors to:
determine transform coefficients for a first block of a slice;
derive a shift parameter for a second block of the slice based on the transform coefficients for the first block, wherein to derive the shift parameter for the second block of the slice based on the transform coefficients for the first block, the one or more processors are further configured to derive the shift parameter for the second block of the slice without receiving explicit signaling indicating a value for the shift parameter, wherein the value for the shift parameter is equal to an integer value N, wherein N is greater than or equal to 0;
receive one or more flags for a transform coefficient for the second block;
determine a value for the transform coefficient for the second block based on the one or more flags and based on the shift parameter, wherein to determine the value for the transform coefficient for the second block based on the one or more flags and based on the shift parameter, the instructions cause the one or more processors to:
determine whether the transform coefficient is greater than or equal to $2^N$ based on a value of a first flag;
determine whether the transform coefficient is greater than or equal to $2^{N+1}$ based on a value of a second flag; and
determine whether the transform coefficient is greater than or equal to $2^{N+2}$ based on a value for a third flag; and output a decoded version of the second block based on the determined value for the transform coefficient.

21. For encoding video data, the device comprising:
a memory configured to store video data;
one or more processors implemented in circuitry and configured to:
  determine transform coefficients for a first block of a slice;
  derive a shift parameter for a second block of the slice based on the transform coefficients for the first block, wherein to derive the shift parameter for the second block of the slice based on the transform coefficients for the first block, the one or more processors are further configured to derive the shift parameter for the second block of the slice without receiving explicit signaling indicating a value for the shift parameter, wherein the value for the shift parameter is equal to an integer value N, wherein N is greater than or equal to 0;
  determine a value for a transform coefficient for the second block;
determine values for one or more flags based on the value for the transform coefficient and the shift parameter, wherein to determine the values for the one or more flags based on the value for the transform coefficient and the shift parameter, the one or more processors are further configured to:
  determine a value for a first flag based on whether the transform coefficient is greater than or equal to $2^N$,
  determine a value for a second flag based on whether the transform coefficient is greater than or equal to $2^{N+1}$, and
  determine a value for a third flag based on whether the transform coefficient is greater than or equal to $2^{N+2}$, and
output a bitstream of encoded video data that includes the one or more flags.

22. The device of claim 21, wherein to derive the shift parameter for the second block of the slice based on the transform coefficients for the first block, the one or more processors are further configured to derive the shift parameter for the second block of the slice based on values of the transform coefficients for the first block.

* * * * *